United States Patent
Jin et al.

(10) Patent No.: US 8,423,095 B2
(45) Date of Patent: *Apr. 16, 2013

(54) SYSTEM AND METHOD OF DETERMINING STANDBY TIME FOR MOBILE STATIONS BY CONNECTING A SIMULATOR TO THE MOBILE STATION, MEASURING AVERAGE CURRENT CONSUMPTION, AND DETERMINING ACTUAL BATTERY CAPACITY USAGE

(75) Inventors: Xin Jin, Waterloo (CA); Jennifer Anne Elizabeth Mallalieu, Ottawa (CA); Fiona Shearer, Ottawa (CA)

(73) Assignee: Research In Motion Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/245,242

(22) Filed: Sep. 26, 2011

(65) Prior Publication Data

US 2012/0015647 A1    Jan. 19, 2012

Related U.S. Application Data

(63) Continuation of application No. 12/949,229, filed on Nov. 18, 2010, now Pat. No. 8,055,314, which is a continuation of application No. 12/752,330, filed on Apr. 1, 2010, now Pat. No. 7,873,393, which is a continuation of application No. 11/494,443, filed on Jul. 28, 2006, now Pat. No. 7,706, 845.

(60) Provisional application No. 60/703,429, filed on Jul. 29, 2005.

(51) Int. Cl.
*H04M 1/00* (2006.01)

(52) U.S. Cl.
USPC .............. 455/574; 455/127.1; 455/127.5; 455/572; 455/573; 370/311; 370/318; 320/106; 320/127; 320/132; 320/149; 324/426; 324/428; 324/433

(58) Field of Classification Search .......... 455/423–425, 455/550.1, 556.2, 572–575.1, 343.1–343.5, 455/127.1, 522, 127.5; 370/311, 318; 320/106, 320/127, 132, 134, 149; 324/426, 428, 433
See application file for complete search history.

(56) References Cited

U.S. PATENT DOCUMENTS

| | | | | |
|---|---|---|---|---|
| 5,248,929 A | * | 9/1993 | Burke | 320/127 |
| 5,606,242 A | * | 2/1997 | Hull et al. | 320/106 |
| 5,608,324 A | * | 3/1997 | Yoshida | 324/426 |
| 5,648,717 A | * | 7/1997 | Uskali | 324/428 |
| 5,654,623 A | * | 8/1997 | Shiga et al. | 320/106 |
| 5,739,674 A | * | 4/1998 | Kawahara et al. | 320/106 |
| 5,789,901 A | * | 8/1998 | Lomholt | 320/134 |

(Continued)

*Primary Examiner* — Anthony Addy
*Assistant Examiner* — Babar Sarwar
(74) *Attorney, Agent, or Firm* — Gowling Lafleur Henderson LLP

(57) ABSTRACT

A method and system for determining standby time for a mobile station uses a battery simulator, a base station emulator, a computer to control the test equipment and MSUT for testing a mobile station. The computer includes a module for determining a radio off battery voltage, a module for deriving a battery capacity in dependence upon the radio off battery voltage, a module for measuring battery capacity usage in a predetermined time while the mobile station is in standby mode and a module for determining a standby time for the mobile station in dependence upon the battery capacity and the battery capacity usage, where the predetermined time is less than the standby time.

27 Claims, 13 Drawing Sheets

U.S. PATENT DOCUMENTS

| | | | |
|---|---|---|---|
| 5,844,884 A * | 12/1998 | Szlenski | 320/149 |
| 6,087,808 A * | 7/2000 | Pritchard | 320/132 |
| 6,236,214 B1 * | 5/2001 | Camp et al. | 324/427 |
| 6,405,062 B1 * | 6/2002 | Izaki | 455/573 |
| 6,433,512 B1 * | 8/2002 | Birkler et al. | 320/132 |
| 6,684,083 B1 * | 1/2004 | Harimoto | 455/556.1 |
| 6,898,438 B1 * | 5/2005 | Uchida | 455/522 |
| 6,917,792 B2 * | 7/2005 | Kim | 455/127.5 |
| 7,783,261 B2 * | 8/2010 | Peng et al. | 455/67.11 |
| 2007/0114971 A1 * | 5/2007 | Uesaka et al. | 320/132 |

* cited by examiner

SYSTEM AND METHOD OF DETERMINING STANDBY TIME FOR MOBILE STATIONS BY CONNECTING A SIMULATOR TO THE MOBILE STATION, MEASURING AVERAGE CURRENT CONSUMPTION, AND DETERMINING ACTUAL BATTERY CAPACITY USAGE

CROSS-REFERENCE TO RELATED APPLICATIONS

This application is a continuation of application Ser. No. 12/949,229, filed on Nov. 18, 2010, now allowed, which is a continuation of application Ser. No. 12/752,330, filed on Apr. 1, 2010, now U.S. Pat. No. 7,873,393, which is a continuation of application Ser. No. 11/494,443 filed on Jul. 28, 2006, now U.S. Pat. No. 7,706,845, which is a non-provisional application claiming the benefit of U.S. Provisional Application No. 60/703,429 filed Jul. 29, 2005, all prior applications are hereby incorporated by reference.

This patent document relates generally to testing mobile stations, and in particular to a system and method of determining standby time for mobile stations.

BACKGROUND

Mobile station battery life is usually described in terms of talk-time and standby time. Known methods of measuring standby time for mobile stations require substantial lengths of time to execute. With the proliferation of mobile station models and features, standby time determination must be repeated for each new variation, adding considerable cost to test protocols. The current method used to test standby time detailed in a standard by the CDMA Development Group (CDG 35) has an extremely long test time which is equal to its standby time, almost 10 days in some cases. The length of these tests makes it nearly impracticable to run multiple test cases.

There is a need for a mobile terminal standby test method and apparatus that reduces test times.

BRIEF DESCRIPTION OF THE DRAWINGS

An embodiment of the patent disclosure will now be described by way of example only with reference to the following drawings in which.

DETAILED DESCRIPTION

Figure 1:
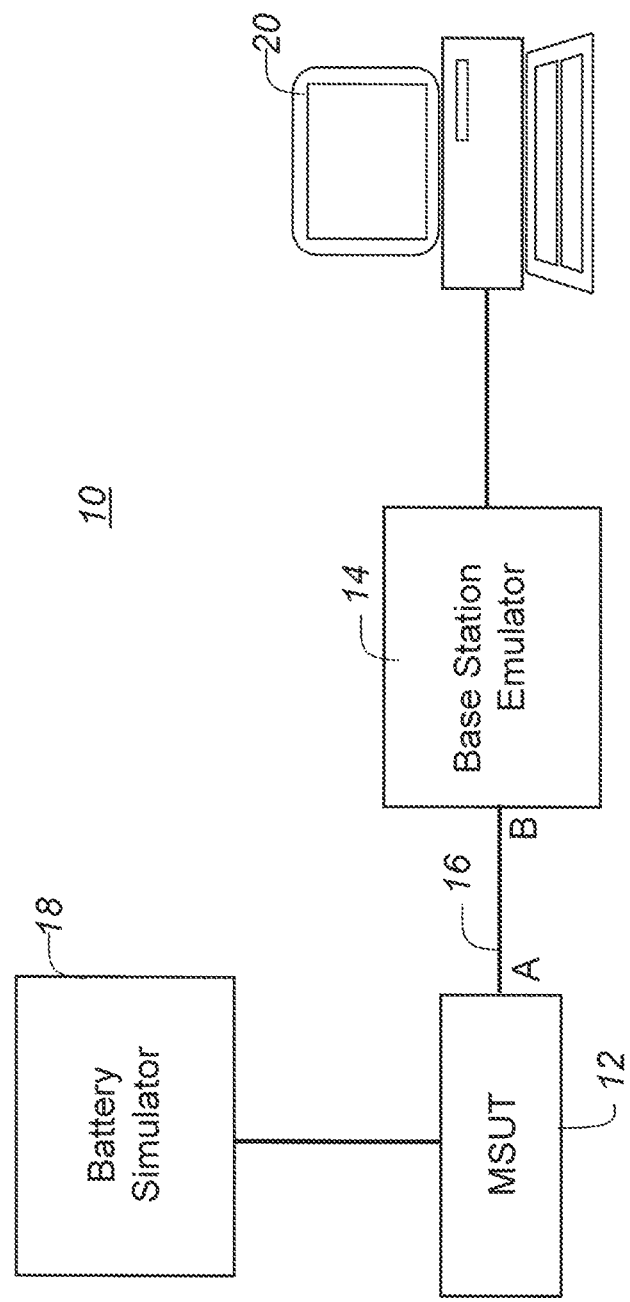
FIG. 1 there is illustrated an example of a system for determining standby time, in accordance with an embodiment of the patent disclosure.

The patent disclosure describes a solution to one or more of the problems described above.

The technology disclosed herein is particularly well suited for use in Personal Digital Assistants (PDAs), mobile communication devices, cellular phones, and wireless two-way e-mail communication devices (collectively referred to herein as "mobile stations" or "mobile devices").

The term "battery capacity" is used to refer to the capacity of a battery. Typically in a mobile terminal environment it is the amount of discharge from a fully charged battery, to the mobile terminal battery cut off voltage. The battery cut off voltage is usually the voltage at which the mobile terminal shuts down or in some instance where the radio is shut off or disabled. The term "battery capacity consumed" (also known as "charge consumed" or "charge") is used to refer to the amount of discharge.

In accordance with an embodiment of the patent disclosure, there is provided a simulated standby time test method that determines a standby time of a MSUT based on available battery capacity and characterization of radio shut-off voltage, receive and transmit current measurements, which advantageously considerably cuts down the test time. For mobile device where radio is the only function, the radio shut-off voltage is equivalent to mobile device shut-off. For some smart phones or PDAs, the radio will shut-off before the mobile device shuts off, and radio shut-off voltage should be characterized. In this document radio shut-off will be used.

In accordance with another embodiment of the patent disclosure, there is provided a method of determining standby time for a mobile station. The method comprises the steps of for a predetermined time, measuring battery capacity usage while the mobile station is in standby mode, and determining a standby time for the mobile station in dependence upon the battery capacity and the battery capacity usage, where the predetermined time is less than the standby time.

In accordance with another embodiment of the patent disclosure, there is provided a method of determining standby time for a mobile station. The method comprises the steps of for a predetermined time, measuring average current consumption while the mobile station is in standby mode, and determining a standby time for the mobile station in dependence upon the battery capacity and the average current consumption, where the predetermined time is less than the standby time.

In accordance with another embodiment of the patent disclosure, there is provided a method of determining standby time for a mobile station. The method comprises the steps of determining a radio off battery voltage, deriving a battery capacity in dependence upon the radio off battery voltage, for a predetermined time, measuring battery capacity usage while the mobile station is in standby mode, and determining a standby time for the mobile station in dependence upon the battery capacity and the battery capacity usage, where the predetermined time is less than the standby time.

In accordance with another embodiment of the patent disclosure, there is provided a method of determining standby time for a mobile station. The method comprises the steps of determining a radio off battery voltage, deriving a battery capacity in dependence upon the radio off battery voltage, for a predetermined time, measuring average current consumption while the mobile station is in standby mode, and determining a standby time for the mobile station in dependence upon the battery capacity and the average current consumption, where the predetermined time is less than the standby time.

In accordance with another embodiment of the patent disclosure, there is provided a system for determining standby time for a mobile station. The system comprises a battery simulator, a base station emulator and a computer including a module for determining a radio off battery voltage, a module for deriving a battery capacity in dependence upon the radio off battery voltage, a module for measuring battery capacity usage in a predetermined time while the mobile station is in standby mode and a module for determining a standby time for the mobile station in dependence upon the battery capacity and the battery capacity usage, where the predetermined time is less than the standby time.

In accordance with another embodiment of the patent disclosure, there is provided a system for determining standby time for a mobile station. The system comprises a battery simulator, a base station emulator and a computer including a module for determining a radio off battery voltage, a module for deriving a battery capacity in dependence upon the radio off battery voltage, a module for measuring current consumption while the mobile station is in standby mode and a module for determining a standby time for the mobile station in dependence upon the battery capacity and average current consumption, where the predetermined time is less than the standby time.

A system and method of the patent disclosure will now be described with reference to various examples of how the embodiments can best be made and used. For convenience, like reference numerals are used throughout the description and several views of the drawings to indicate like or corresponding parts, wherein the various elements are not necessarily drawn to scale. All units of measurement provided in this disclosure are by way of example only. Alternative units of measurement can be used with appropriate amendments to the calculations described herein.

This method simulates the standby time of the MSUT. The following method describes the calculations that were used to achieve the results.

Capacity, measured in units of Ampere*hours (Ah), is a standard indication of how long a battery can last. The standby time (hours) of a MSUT can be calculated by dividing the capacity available from a fully charged battery by the capacity used in one hour (i.e., the amount of charge discharged in one hour) with the MSUT in standby.

Referring to FIG. 1 there is illustrated a system 10 for determining standby time for a mobile station. Test equipment coupled to a MSUT 12 (with its battery removed) includes a base station emulator 14, for example an Agilent 8960-10 coupled via a radio frequency (RF) cable 16 to the MSUT antenna connector, a battery simulator (also known as a "battery simulator power supply", referred to as a battery simulator in this description) 18 coupled to the battery contacts of the MSUT 12, for example an Agilent 66321D, an equivalent series resistance (ESR) is programmed in the battery simulator 18 to equate to the ESR value of the battery used in the MSUT may be used (alternatively a lead having the same series resistance as the ESR of the mobile battery may be used) and a computer 20 for data collection and/or control.

Figure 2:
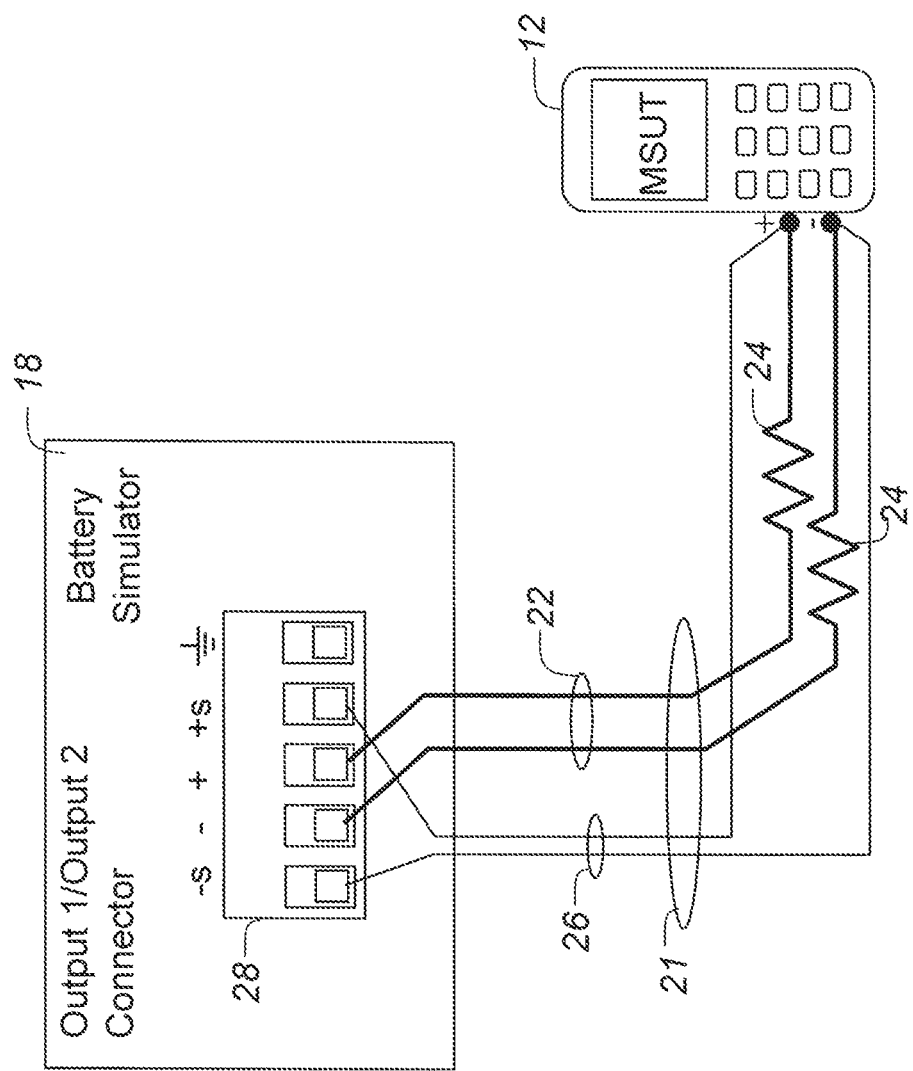
FIG. 2 there is illustrated an example of a four wire setup for a mobile station under test (MSUT) in accordance with an embodiment of the patent disclosure.

Referring to FIG. 2 there is shown a four wire setup 21 between the battery simulator 18 and the MSUT 12. The wire set up includes a pair of power lines twisted together 22, each having (undesirable) series resistance of the wire 24, and a twister pair of sense lines 26. The mobile battery is removed and the battery simulator 18 is connected using the four wire set up 21 so that the battery simulator 18 would effectively compensate for the series resistance 24. If the four wire set up 21 is not used then the external equivalent series resistance (ESR) 24 of the wires connecting to the battery simulator to the device must be accounted for in programming the battery ESR value into the battery simulator 18.

The mobile station RF insertion loss between the MSUT 12 and the wireless device tester (i.e. RF cable AB 16) is measured over a range of frequencies using a network analyzer (not shown). The insertion losses are then used in this test to correct the settings for the base station emulator 14 transmit power.

For any given battery voltage, the remaining battery capacity or charge can be determined from tables provided by the battery manufacturer as a function of unloaded voltage of the battery. (The tables can also be determined by discharging a battery with a constant known load while measuring the voltage as a variable over time.) From the tables, the capacity or charge remaining in a fully charged battery ($C_{new}$) and a discharged battery ($C_{cutoff}$) can be determined. The difference is the total battery capacity or charge available to the MSUT.

The voltage of a fully charged battery is dependent on the charger in the MSUT and also on the battery. It can be obtained by measuring the battery voltage using a voltage meter after a battery is fully charged by the charger within the MSUT. However, a cut off voltage (i.e., the voltage at which to turn off the radio by the MSUT) is determined for each individual test case by stepping down the voltage until the radio turns off. Depending on the MSUT software/hardware implementation, it may be necessary to increase the wait time between the voltage steps to ensure that the MSUT has time to update. For simplifying a test, approximations may also be made by only testing one or a few representative test conditions for the cut-off voltage, e.g., using the maximum transmit power condition in a traffic channel transmitting state, rather than testing for each individual conditions such as idle state, registration state, traffic channel transmitting state, etc. Although traffic transmitting state is not used in usual standby conditions, since it is easy to configure and simplifies the test, it can be used to simulate the registration condition with certain degree of accuracy. (Traffic channel and max Tx power condition can be used as a way of approximation).

There are two modes in standby: Receive and Transmit. For the most part the MSUT 12 is in Receive mode, where it waits to receive messages from the network. In this mode, the current draw is quite small. The device spends most of the time in sleep mode, and wakes up for short period of time at scheduled time slots to receive messages from base stations. In Transmit mode, the MSUT is required to transmit registration probes at regular intervals as specified by the network. This mode occurs less frequently, but draws significantly more current when in that state.

In either mode, the capacity or charge used by the MSUT 12 can be determined by measuring the current. Capacity or charge consumed is the integral of current with respect to time: $C=\int i(t)\, dt$. This can be quantized into: $C=\Sigma i(t)*\Delta t$. Therefore, the capacity or charge (C) can be determined by summing the products of current (i(t)) and time interval ($\Delta t$) of current measurement over small intervals, i.e., taking the sum of these measured currents and multiplying the sum by the time interval ($\Delta t$). The capacity or charge used by the MSUT 12 in Receive and Transmit modes is dealt with separately.

In Transmit mode, current measurements are taken for multiple transmit events to determine the total average capacity or charge used for transmitting. For the $j^{th}$ transmit event, the capacity or charge used for transmitting is $C_j$. The total time spent transmitting during that transmit event, $t_j$, is also calculated, as it is needed for calculations later on. The battery current for each transmit event is taken from the MSUT 12 as a vector of equally spaced sample data points. The sampling interval is, in one example, 4 ms and a total of 4096 current measurement data points are downloaded from the battery simulator 18 for each event which form the vector. The actual transmit portion is extracted from the vector.

In a live network, the MSUT 12 may be configured for timer-based registration to transmit at intervals of 15 minutes, 30 minutes, or even longer. By using the test procedure described above in the Base Station Emulator 14 this interval can be configured to be shorter to reduce the amount of test time required to achieve a statistically significant data set of transmit events.

Figure 3:
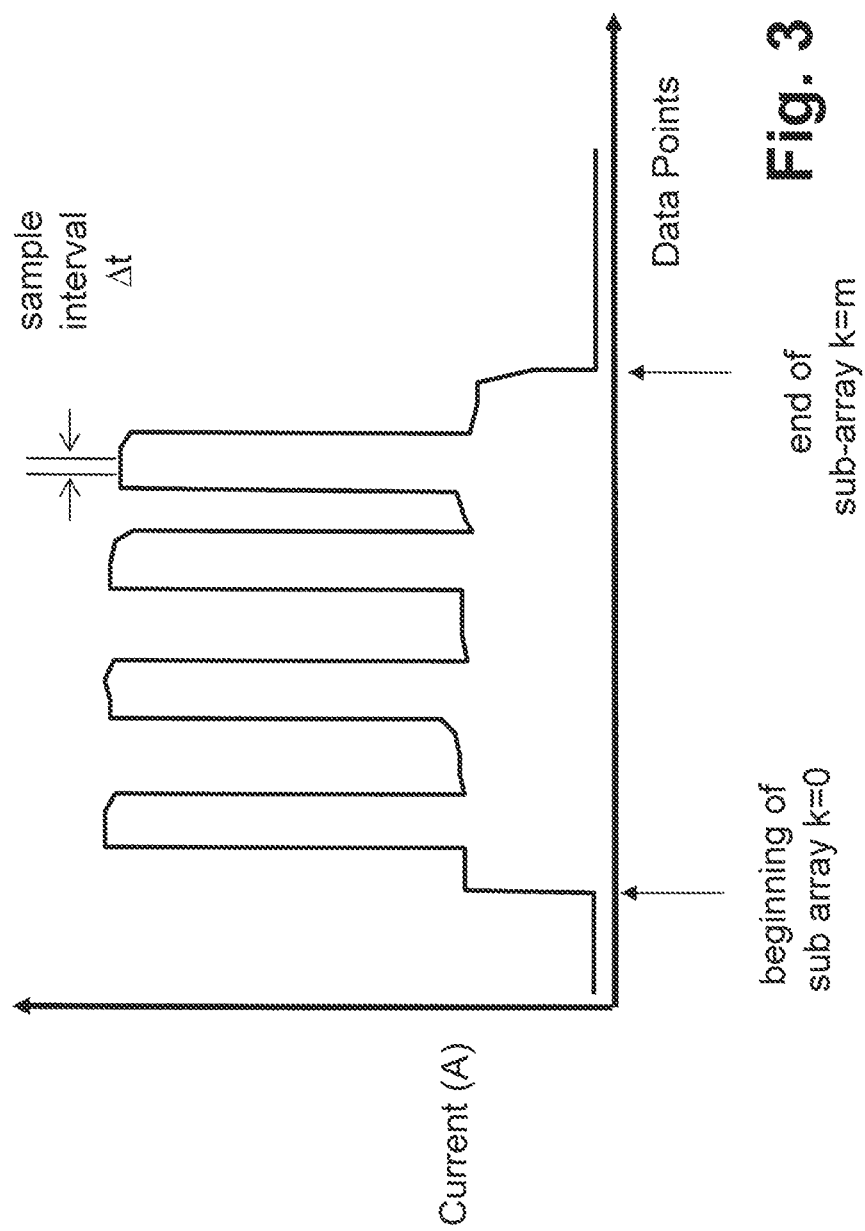
FIG. 3 graphically illustrates an example of transmit mode current measurement, in accordance with an embodiment of the system for determining standby time of the MSUT.

FIG. 3 illustrates an example of a current measurement during Transmit mode, where k represents the data points in the current measurement vector and where $\Delta t$ represents the sample interval between data points in the vector. The element corresponding to k=0 is the first element of the extracted sub-array for the transmit activity, and k=m the last. The beginning and the end of the sub-array is determined by finding the first and the last elements of the measured current array that has higher current value than receive current of the MSUT during "wake-up" of slotted mode operation.

The equations for the capacity or charge $C_j$ and time $t_j$ for each transmit event are shown here, where the current of the $k^{th}$ point in the measurement vector is called $i_k$:

$$C_j=(\Sigma_{k=0}^{m}(i_k))*\Delta t; \text{ and}$$

$$t_j=m*\Delta t.$$

Using the total number of transmit events measured (N) and the number of times the MSUT registers per hour (M) in a network (where in the network, M may or may not be an integer), the total average capacity or charge used for transmitting in one hour ($C_{tx\_in\_1\ hr}$) and the total average time spent in one hour for transmitting ($t_{tx\_in\_1\ hr}$) can be determined:

$$C_{tx\_in\_1\ hr}=(\Sigma_{j=1}^{N}(C_j))*(M/N); \text{ and}$$

$$t_{tx\_in\_1\ hr}=(\Sigma_{j=1}^{N}(t_j))*(M/N).$$

Figure 4:
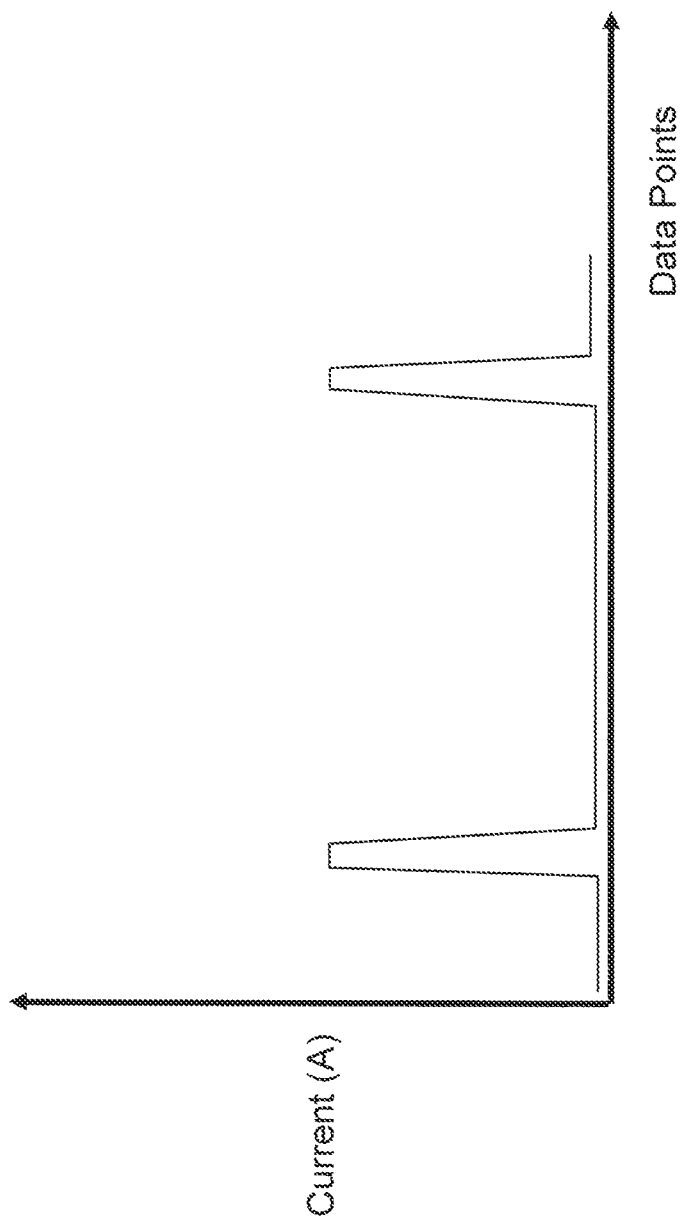
FIG. 4 graphically illustrates an example of receive mode current measurement in accordance with an embodiment of the system for determining standby time of the MSUT.

Referring to FIG. 4, illustrated is an example of a Receive Mode Current Measurement. In Receive mode (including sleep state, processor wake-up activities, and receiver wake-ups in slotted mode), the current waveform has a series of peaks that corresponds to intervals of MSUT 12 activity. The peaks of current caused by wakeups appear at known regular intervals, whereas the peaks caused by processor wake-ups can appear at variable intervals. Each receive measurement is set to capture the current for all receive states including the peaks and base levels, and takes the average current $i_{rx}$. In one example, the measurement interval is 1 ms, a total of 4096 values are in each measured vector.

Since the time spent in Receive mode is simply the amount of time not spent in transmitting, using hour as the unit for time, the total capacity or charge used by the MSUT during one hour while in Receive mode can be found by:

$$C_{rx\_in\_1\ hr}=(i_{rx}*(1-t_{tx\_in\_1\ hr})).$$

Alternatively, since the time spent in transmitting access probes for timer based registration is much smaller than the time spent in Receive mode, the $t_{tx\_in\_1\ hr}$ can be treated approximately as 0 in the calculation of Receive mode consumed capacity or charge.

Therefore the total capacity or charge used by the MSUT in one hour is the sum of the capacity used in both the Receive and Transmit modes:

$$C_{1\ hr}=C_{rx\_in\_1\ hr}+C_{tx\_in\_1\ hr}.$$

The tests may be conducted at different supply voltages and make an average if $C_{1\ hr}$ is dependent of voltage for improved accuracy.

After determining the available battery capacity, ($C_{new}-C_{cutoff}$), and the total capacity or charge used by the MSUT in one hour, $C_{1\ hr}$, the Standby Time ($T_{standby}$ measured in days) can be determined by:

$$T_{standby}=(C_{new}-C_{cutoff})/(C_{1\ hr}*24\text{ hrs/day}).$$

This test method significantly reduces the time required to complete the standby time test cases. Each test can be completed in a matter of hours, instead of days or even weeks.

Alternatively, stand-by time can be calculated using average current instead of consumed capacity (or charge) per hour. In fact, since the quantity current is defined as charge per unit time, charge per hour is also in a dimension of current. Therefore, the only difference is the unit: Amperes (i.e., Coulombs/sec) for the former, and Coulombs/3600 sec for the latter. The terms capacity used in a given time duration, charge consumed in a given time duration, and current consumption are used interchangeably in this disclosure.

The alternative formula for using average current to compute the average transmit capacity or charge consumed by a registration event is:

$$C_{tx}=1/N\,\Sigma_{j=1}^{N}(C_j).$$

The alternative formula for using average current to compute the average transmit current is:

$i_{tx}=C_{tx}/T_{tx}$, where $T_{tx}$ is registration interval.

The alternative formula for using average current to compute the average receive current is:

$i_{rx}=1/T\,\Sigma_{t=0}^{T} i(t)*\Delta t$, where $T$ is the current measurement interval.

The alternative formula for using average current to compute the stand-by time is:

$$T_{standby}=(C_{new}-C_{cutoff})/(i_{tx}+i_{rx}).$$

Standby time is the length of time the mobile station under test (MSUT) 12 can operate in standby mode using its internal battery power.

One embodiment of the test setup is provided herein below for CDMA mobile terminals.

Set the Base Station Emulator according to the test specification. The following shows one example:

Access parameters:
    Nominal Power: 0
    Nominal Power Extended: 0
    Initial Power: 0
    Power Step: 3
    Number of Steps: 5
    Max Response Sequence: 2
    Max Request Sequence: 2
    Preamble Size: 3

RSSI=−75 dBm and Pilot Ec/Io=−7 dBm

The Base Station Emulator also has the following default settings:
    SEARCH WIN A=8
    SEARCH WIN N=8
    SEARCH WIN R=8
    Neighbor list includes 7 PN's
    The Slot Cycle Index in the MSUT can be set to 2 and the Max Slot Cycle Index in the base station emulator is set to either 1 or 2 or other values depending on the test case.
    If the test case requires QPCH be set to ON, then the QPCH level is set to −3 dB relative to pilot.

Configuration Change Indicator (CCI) is Off

Deactivate any radio activities other than idle mode operation, and deactivate any unnecessary applications.

For each Band Class in which the MSUT operates, test the following scenarios using the above specified settings:
    Timer Based Registration Period=15 minutes, QPCH ON (SCI=1 & SCI=2)
    Timer Based Registration Period=15 minutes, QPCH OFF (SCI=1 & SCI=2)
    Timer Based Registration Period=30 minutes, QPCH ON (SCI=1 & SCI=2)
    Timer Based Registration Period=30 minutes, QPCH OFF (SCI=1 & SCI=2)

A test procedure was developed to calculate the standby time based on radio shut-off voltage measurements, the total battery capacity between the fully charged battery voltage and the measured radio shut-off voltage, and multiple current measurements during receive and transmit. The time taken to run a standby time test using this method is considerably shorter than measuring the actual standby time of the device with a battery.

The standby time test procedure comprises four major parts:
1) Determining the battery voltage at which the radio turns off and determine available capacity of the battery;
2) Characterizing transmit current measurements (CDMA registration);
3) Characterizing receive current measurements; and
4) Calculating the standby time of the MSUT.

Setup equipment and MSUT as shown in FIGS. 1 and 2 and wait for the MSUT to go into idle mode.

Figure 5:
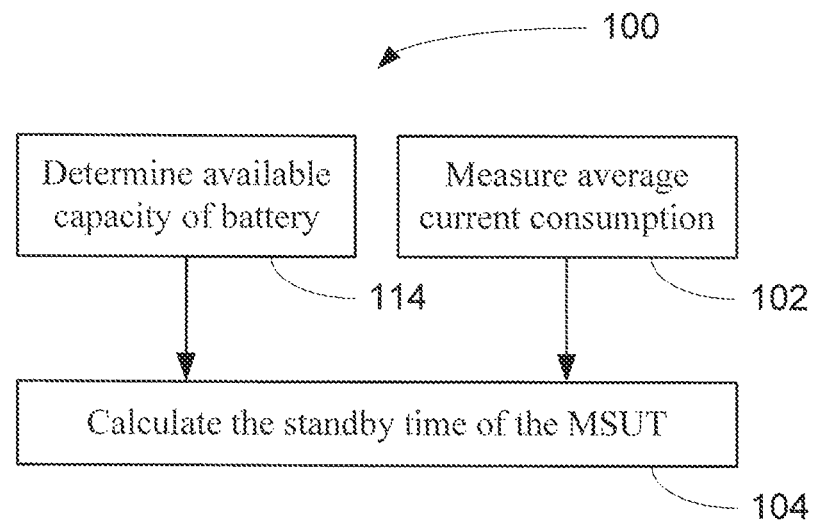
FIG. 5 shows in a flowchart an example of a method of determining standby time for mobile stations, in accordance with an embodiment of the patent disclosure.

FIG. 5 shows in a flowchart an example of a method of determining standby time for mobile stations (100), in accordance with an embodiment of the patent disclosure. The method (100) comprises the steps of measuring average current consumption (102) and determining the available battery capacity (114). Next, the standby time of the MSUT is calculated (104) based upon the available battery capacity and measured average current consumption. Other steps may be added to the method (100).

Figure 6:
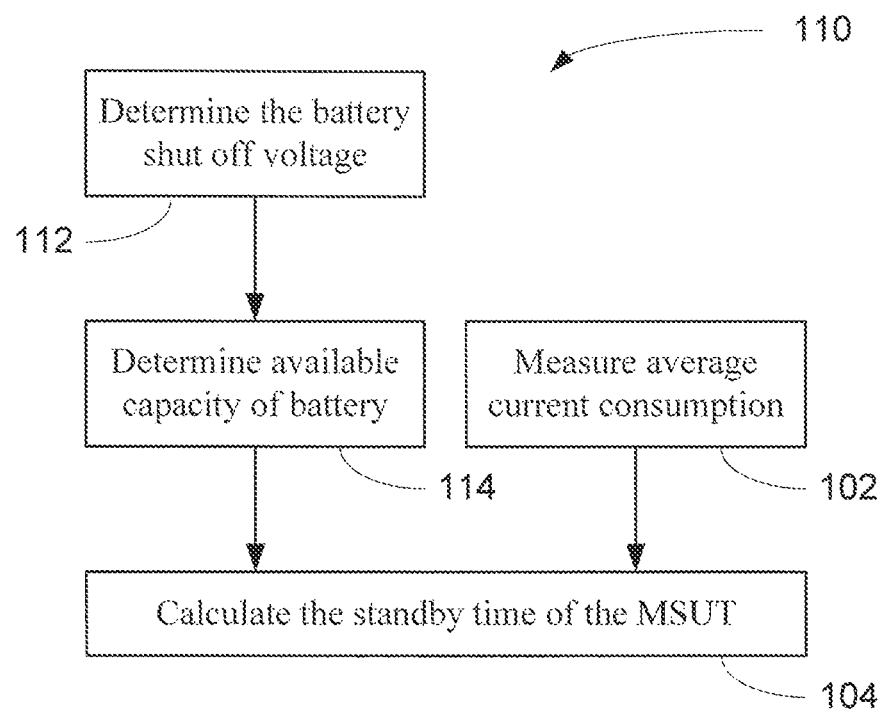
FIG. 6 shows in a flowchart another example of a method of determining standby time for mobile stations, in accordance with an embodiment of the patent disclosure.

FIG. 6 shows in a flowchart another example of a method of determining standby time for mobile stations (110), in accordance with an embodiment of the patent disclosure. The method (110) comprises the steps of determining the battery voltage at which the radio turns off (112) and determining the available capacity of the battery (114). Next the average current consumption is measured (102) and the standby time of the MSUT is calculated (104). Other steps may be added to the method (100).

Figure 7:
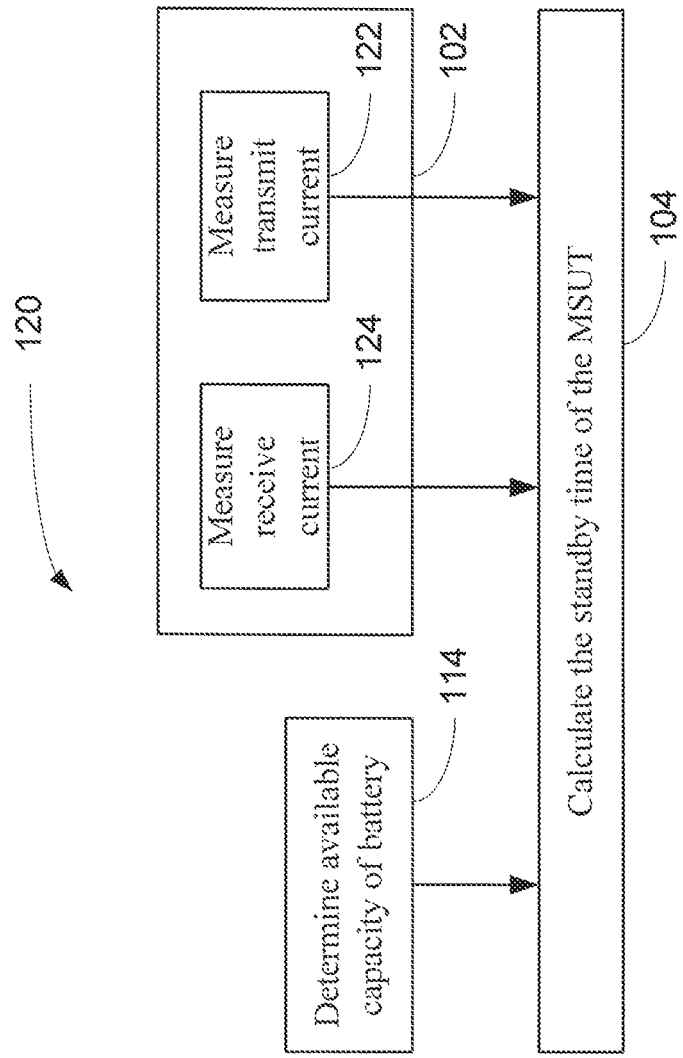
FIG. 7 shows in a flowchart another example of a method of determining standby time for mobile stations, in accordance with an embodiment of the patent disclosure.

FIG. 7 shows in a flowchart another example of a method of determining standby time for mobile stations (120), in accordance with an embodiment of the patent disclosure.

The method (120) comprises the steps of determining the available capacity of the battery (114), measuring transmit current (CDMA registration) (122) and measuring receive transmit current (124). Next the standby time of the MSUT is calculated (104). Other steps may be added to the method (100).

Figure 8:
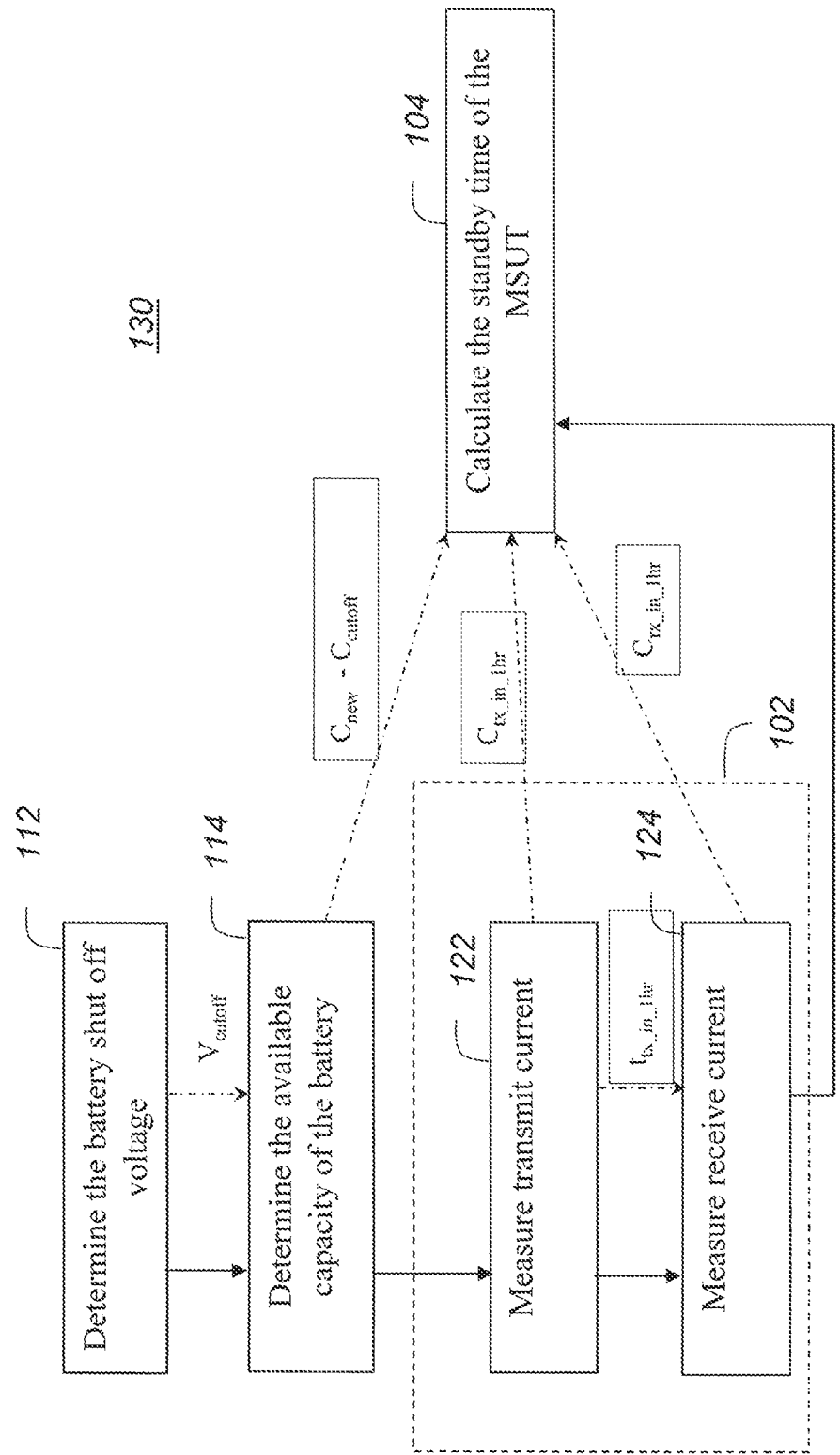
FIG. 8 shows in an execution and variable flow diagram another example of a method of determining standby time for mobile stations, in accordance with an embodiment of the patent disclosure.

FIG. 8 shows in an execution and variable flow diagram another example of a method of determining standby time for mobile stations (130), in accordance with an embodiment of the patent disclosure. The method (130) comprises the steps of determining the battery voltage at which the radio turns off ($V_{cutoff}$) (112) and determining the available capacity of the battery (114). Next, transmit current is measured (CDMA registration) (122). Next, receive current is measured (124). The transmit current time measurement $t_{tx\_in\_1\ hr}$ was calculated in step (122). Finally, the standby time of the MSUT is calculated (104). For the last step (104), the available capacity $C_{new}-C_{cutoff}$ was calculated in step (114), the transmit current capacity measurement $C_{tx\_in\_1\ hr}$ was calculated in step (122) and the receive current measurement $C_{rx\_in\_1\ hr}$ was calculated in step (124). Alternatively, if the available capacity and/or the transmit current capacity measurements are known, these may be provided to a module that executes the final step (104).

Figure 9:
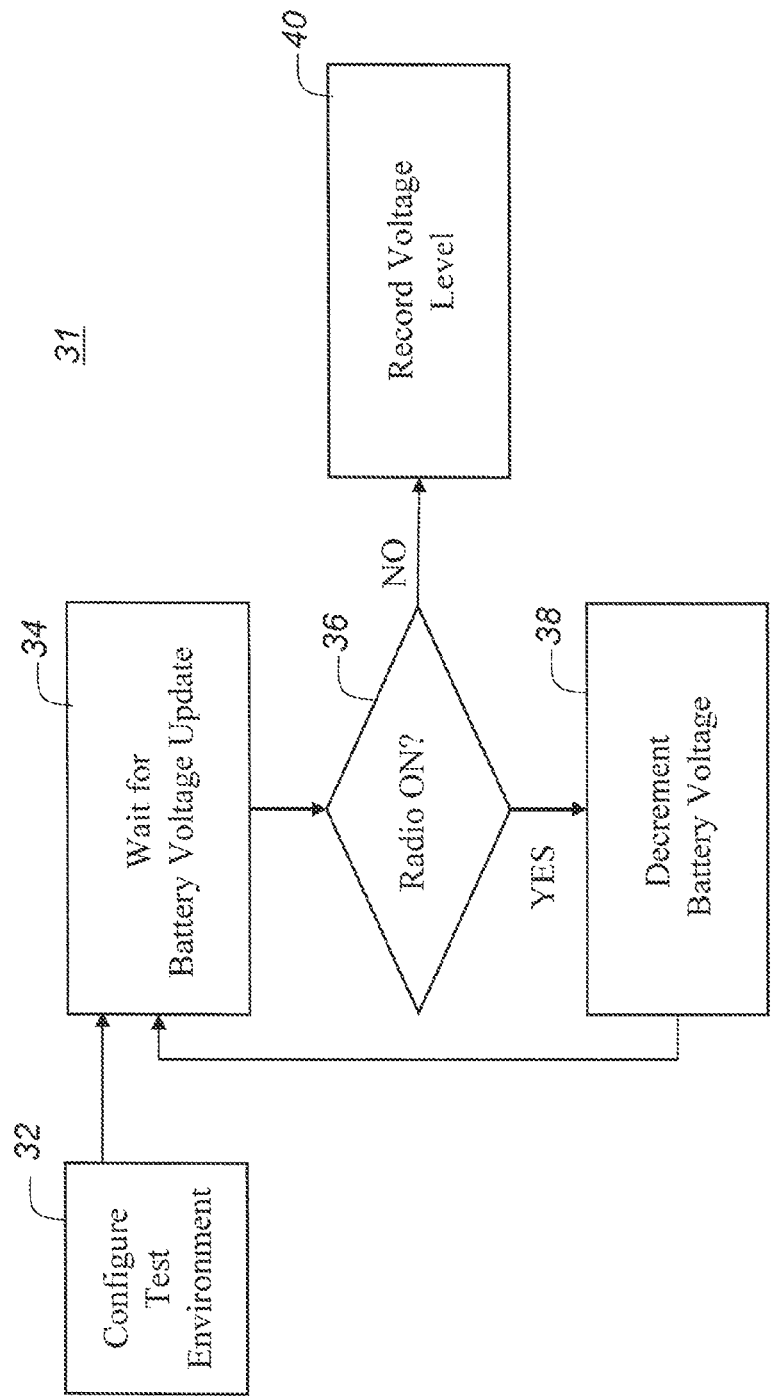
FIG. 9 shows in a flowchart an example of a method of determining the radio shut off voltage, in accordance with an embodiment of the patent disclosure.

FIG. 9 shows in a flowchart an example of a method of determining the radio shut off voltage (31), in accordance with an embodiment of the patent disclosure. The method (31) begins with configuring a test environment by setting up a mobile to be set to desired working conditions (32). Next, wait the sufficient time needed for the MSUT software/hardware to update the battery voltage internally (34). If the ratio is still on (36), then decrement the battery voltage (38) and return to step (34). Otherwise (36), record the voltage level at which the radio turned off (40). Other steps may be added to this method (31).

Figure 10:
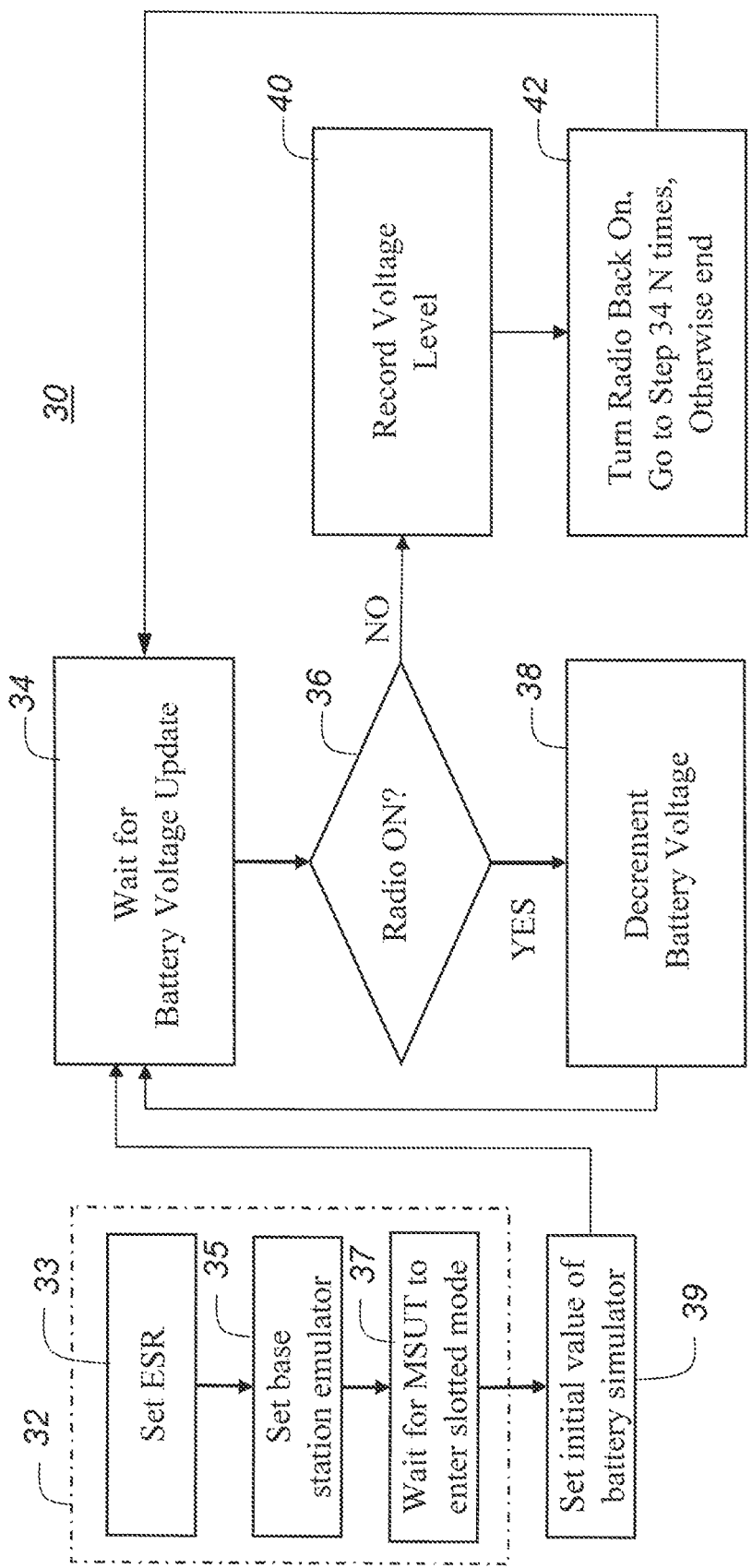
FIG. 10 shows in a flowchart another example of the process to determine radio shut off voltage, in accordance with an embodiment of the patent disclosure.

FIG. 10 shows in a flow chart another example of the process to determine radio shut off voltage (30), in accordance with an embodiment of the patent disclosure. The process (30) comprises generally of the following steps:
1) Program the battery simulator to simulate the ESR of the battery using 4-wire setup (33).
2) Set the base station emulator to transmit at desired level in accordance to test specification, and set all other parameters in accordance to test specification (35).
3) Wait for the MSUT to acquire the signal from the base station emulator, and enter the slotted mode of operation (37).
4) Program the battery simulator unloaded voltage to a small quantity (for example, 0.2 V) above the expected radio shut-off voltage, to initiate test (39).
5) Wait sufficient time needed for the MSUT software/hardware to update the battery voltage internally (34).
6) Query to see if the radio is still on (36). (This can be accomplished by trying to force a registration of the MSUT with the base station emulator).
7) Step the battery voltage down by a small quantity (for example, 0.01V) (38).

8) Repeat steps 5 thru 7 until radio turns off
9) Record the voltage level at which radio turns off (40).
10) Program the battery simulator unloaded voltage to a small quantity (for example, 0.2 V) above the expected radio shut-off voltage, turn the radio back on, and repeat steps 5 thru 9 a number of times to get a reliable average value of radio shut-off voltage (42).

Once the radio off voltage has been determined, the available capacity of the battery to be used in the standby time calculations is calculated. To do this, the battery capacity vs. unloaded voltage profile table is characterized.

To characterize the transmit current measurements (122), the base station emulator is set with the timer based registration to "on" and the base station emulator is programmed to have the MSUT 12 register periodically (preferably shorter than the actual registration interval when used in a CDMA network, for example, every 12.1 to 30 seconds), disabling all other types of registrations except power up registration, and set the base station emulator output power to the values as defined in the test specification (e.g., −75 dBm) with path loss accounted for. The setting to have MSUT 12 register every 12.1 to 30 seconds is not related to the network configuration under which the standby time to be tested and is used only to reduce test time.

Using the battery simulator 18, the output voltage is set to a desired value, e.g., the nominal battery voltage, and a sampling interval and array size are selected which will have a long enough window to be able to extract the sub-array of the measured battery current to cover the entire transmit activity from start of the transmitter warm-up for the registration to its end (e.g., download 4096 data points from battery simulator 66321D at sampling interval of 4 ms will ensure a window large enough to capture transmit and back to receive). The battery simulator can buffer pre-trigger current measurement data points, which will ensure capturing current data prior to the triggering point and covers a time span from receive to transmit back to receive modes. See FIG. 3 as an example.

Figure 11:
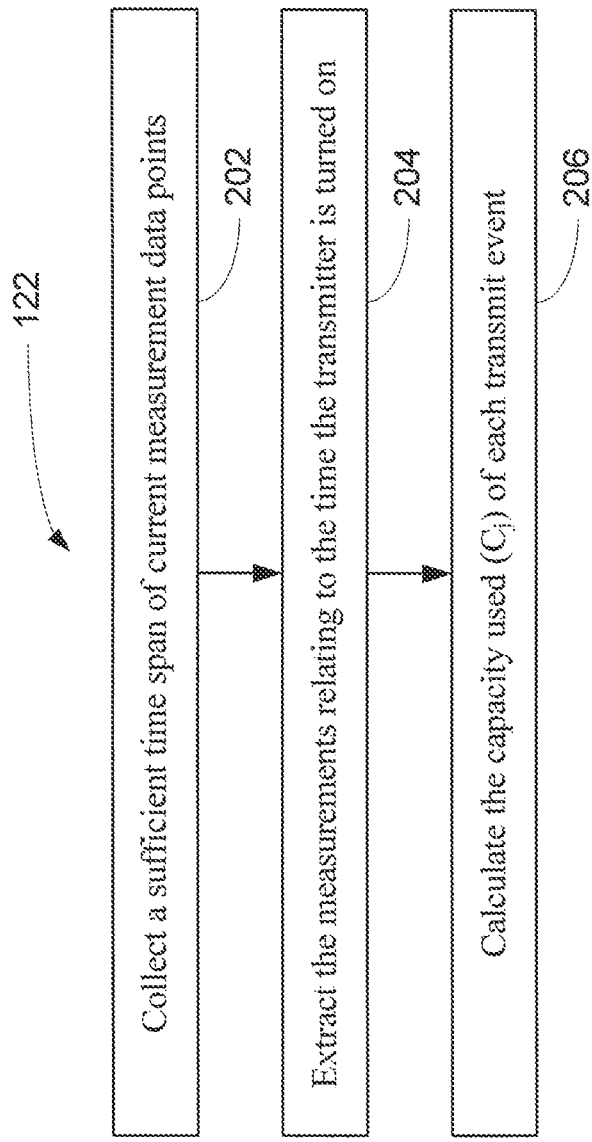
FIG. 11 shows in a flowchart an example of a method of characterizing transmit current measurements, in accordance with an embodiment of the patent disclosure.

FIG. 11 shows in a flowchart an example of a method of measuring transmit current (122), in accordance with an embodiment of the patent disclosure. The method (122) comprises the steps of collecting a sufficient time span of current measurement data points (202). Next, the measurements relating to the time the transmitter is turned on are extracted (204). Finally, the capacity used ($C_j$) and time duration ($t_j$) of each transmit event are calculated (206). Other steps may be added to this method (122).

Figure 12:
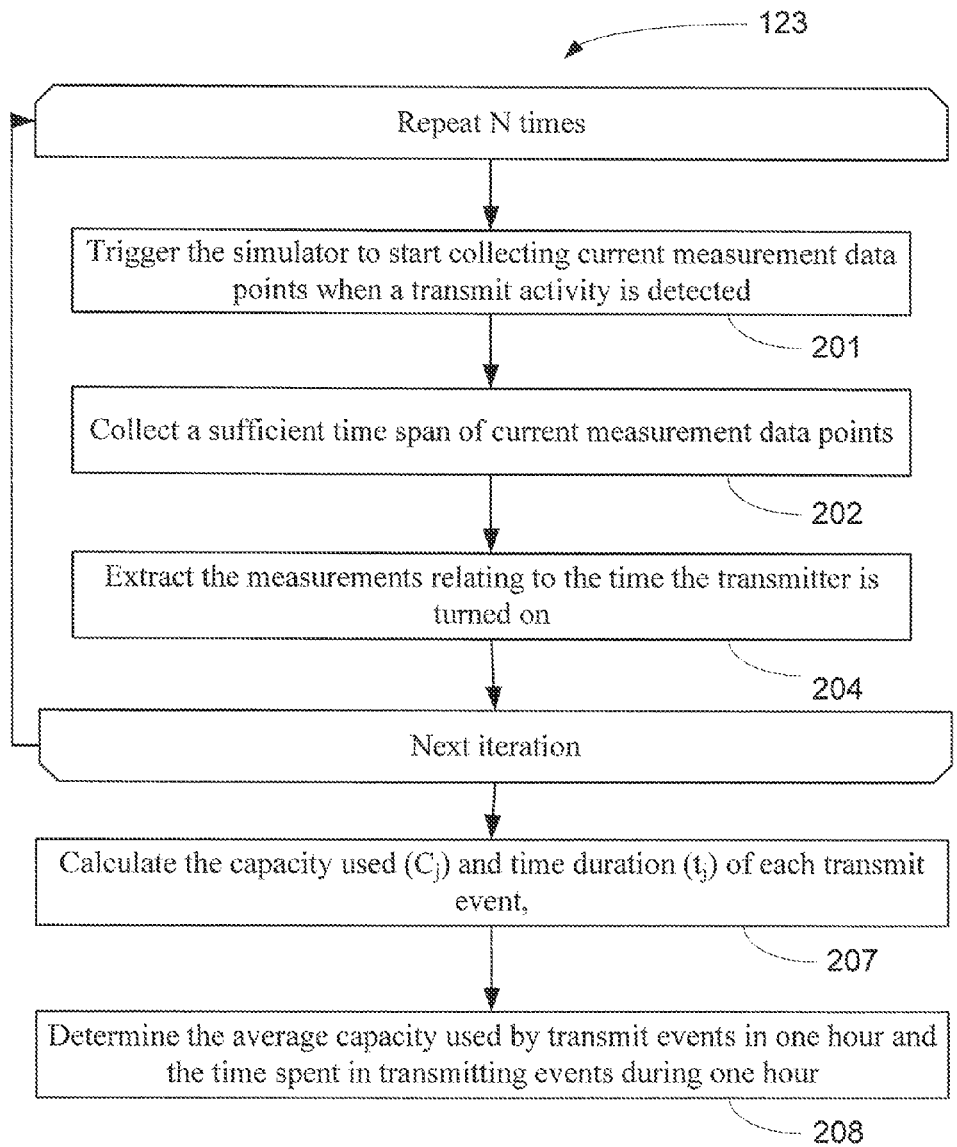
FIG. 12 shows in a flowchart another example of a method of characterizing transmit current measurements, in accordance with an embodiment of the patent disclosure.

FIG. 12 shows in a flowchart another example of a method of measuring transmit current (123) using the battery simulator 18, in accordance with an embodiment of the patent disclosure. The method (123) comprises generally of the following steps:
1) Trigger the simulator to start collecting current measurement data points when a transmit activity is detected (201) (e.g., by a threshold set for current level exceeding the current consumption level for receiver only operation, such as 250 mA).
2) Collect the sufficient time span of current measurement data points from battery simulator (202) (66321D will be able to download an array of 4096 data points).
3) Extract, from the data array, the sub-array for the portion of time the transmitter is turned on (204).
4) Knowing the current at each data point in the sub-array extracted, allows the calculation of the capacity used ($C_j$) and time duration ($t_j$) of each transmit event (206):

$C_j = (\Sigma_{k=0}^{m}(i_k))*\Delta t$; and $t_j = m*\Delta t$, where k=0 is the first point of the transmit activity, m is the last point of the transmit activity, and $\Delta t$ is the sample interval.
5) Repeat 1) through 5) to record N transmit measurements (desirably N>100).
6) Determine the average capacity used by transmit events in one hour ($C_{tx\_in\_1\;hr}$), and the time spent in transmitting events during one hour ($t_{tx\_in\_1\;hr}$) (208).

$C_{tx\_in\_1\;hr} = (\Sigma_{j=1}^{N}(C_j))*(M/N)$; and $t_{tx\_in\_1\;hr} = (\Sigma_{j=1}^{N}(t_j))*(M/N)$, where N is the total number of transmit events measured; and where M is the number of registrations per hour based on network registration period configuration for which the standby time needs to be determined (M may not be an integer).

Figure 13:
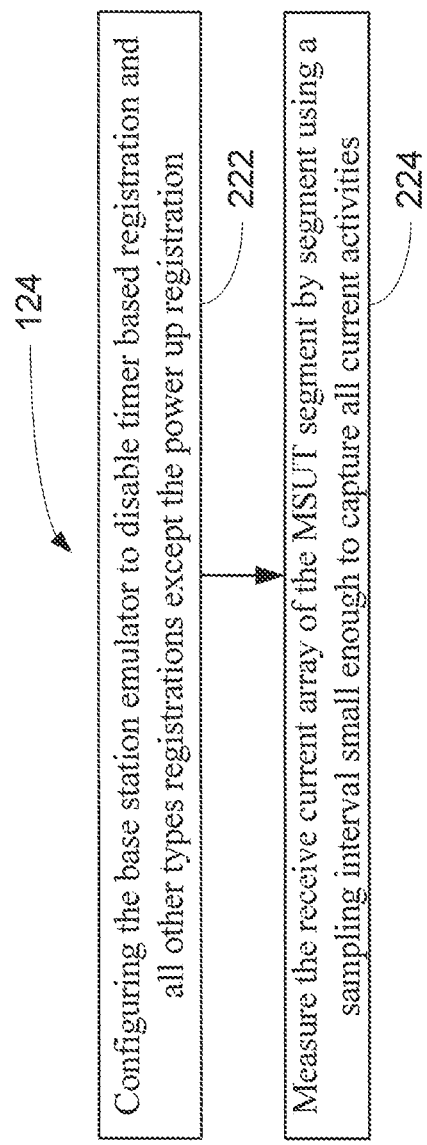
FIG. 13 shows in a flowchart an example of a method of characterizing receive current measurements, in accordance with an embodiment of the patent disclosure.

FIG. 13 shows in a flowchart an example of a method of measuring receive current (124), in accordance with an embodiment of the patent disclosure. The method (124) begins with configuring the base station emulator to disable timer based registration and all other types registrations except the power up registration (222). Next, the receive current array of the MSUT is measured segment by segment using a sampling interval small enough to capture all current activities (224). Preferably, this sampling interval is no larger than 1 ms. Other steps may be added to this method (124).

Figure 14:
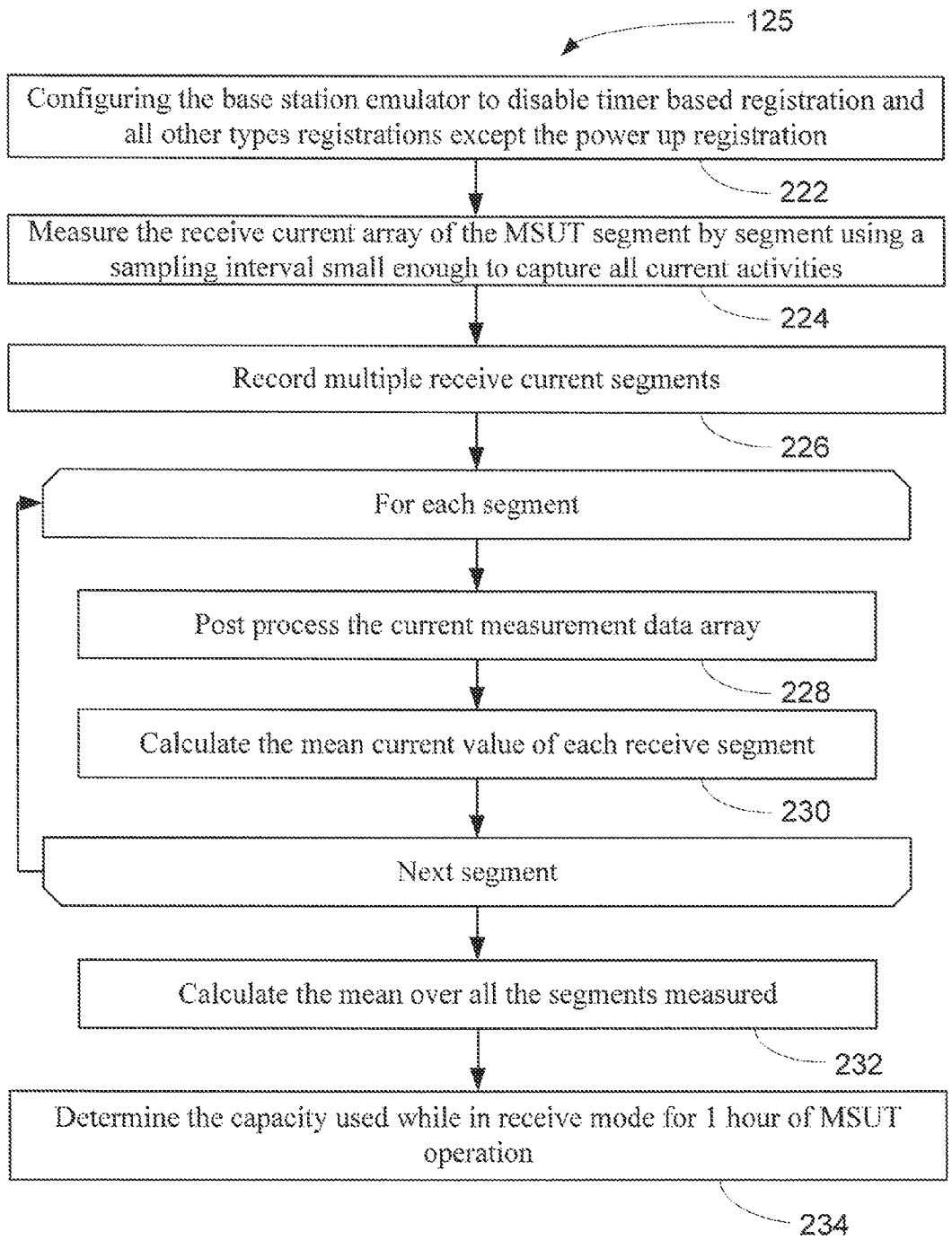
FIG. 14 shows in a flowchart another example of a method of characterizing receive current measurements, in accordance with an embodiment of the patent disclosure.

FIG. 14 shows in a flowchart another example of a method of measuring receive current (125), in accordance with an embodiment of the patent disclosure. The following receive current measurements are performed for each test condition being tested (such as SCI values, quick paging settings). Again, using the battery simulator,
1) Configure the base station emulator to disable timer based registration and all other types registrations except the power up registration (222).
2) Measure the receive current array of MSUT segment by segment using a sampling interval small enough to capture all current activities (224). Preferably, this sampling interval is no larger than 1 ms.
3) Record multiple receive current segments (226) (e.g., greater than 100).
4) For each segment, post process the current measurement data array (228), calculate the mean current value of each receive segment (230), and further calculate the mean over all the segments measured (232), denote it $i_{rx}$.
5) Determine the capacity used while in receive mode for 1 hour of MSUT operation (234):
In 1 hour operation, the amount of time spent in receive mode is simply the amount of time the MSUT is not in transmit mode, which is $(1-t_{tx\_in\_1\;hr})$ hour, thus the capacity used for 1 hour by receive mode:

$C_{rx\;in\;1\;hr} = (i_{rx}*(1-t_{tx\;in\;1\;hr}))$.

The capacity used in one hour for both transmit and receive activities is known, thus the total capacity used by the MSUT in one hour is:

$C_{1\;hr} = C_{rx\_in\_1\;hr} + C_{tx\_in\_1\;hr}$.

Using the available battery capacity determined as described previously, the standby time in hours can then be determined (104) by:

$T_{standby} = (C_{new} - C_{cutoff})/(C_{1\;hr})$.

The system and methods according to the present disclosure may be implemented by any hardware, software or a combination of hardware and software having the above described functions. The software code, either in its entirety or a part thereof, may be stored in a computer readable memory. Further, a computer data signal representing the software code which may be embedded in a carrier wave may be transmitted via a communication network. Such a computer readable memory and a computer data signal are also within the scope of the present disclosure, as well as the hardware, software and the combination thereof.

While particular embodiments of the patent disclosure have been shown and described, changes and modifications may be made to such embodiments without departing from the true scope of the patent disclosure.

What is claimed is:

1. A method, comprising:
   coupling a battery simulator to a mobile station, the battery simulator configured to provide the mobile station with a simulated battery voltage;
   measuring, for a predetermined time period, a plurality of current measurement data points of the mobile station in standby mode;
   calculating, from the plurality of current measurement data points, an average current consumption associated with the mobile station in the standby mode;
   determining an actual battery capacity of a battery for the mobile station; and
   determining a standby time of the mobile station based on the average current consumption and the actual battery capacity.

2. The method of claim 1, wherein the predetermined time period is less than the standby time.

3. The method of claim 1, wherein the average current consumption measured is an average value determined over the predetermined time period.

4. The method of claim 1, further comprising:
   determining a battery cut off voltage for the mobile station.

5. The method of claim 4, wherein determining the actual battery capacity comprises:
   deriving the actual battery capacity in dependence upon the battery cut off voltage of the mobile station.

6. The method of claim 4, wherein the actual battery capacity is an amount of discharge from a fully charged battery to the battery cut off voltage.

7. The method of claim 6, further comprising:
   fully-charging the battery; and
   determining the fully-charged voltage of the battery after being fully charged, and wherein the actual battery capacity is determined based on a difference between the fully-charged voltage and the battery cut off voltage.

8. The method of claim 4, wherein the battery cut off voltage for the mobile station is determined by stepping down the simulated battery voltage until a radio of the mobile station turns off.

9. The method of claim 4, wherein the determining the battery cut off voltage comprises:
   adjusting the simulated battery voltage provided to the mobile station;
   determining a voltage level at which a mobile station radio turns off as the battery cut off voltage.

10. A system comprising:
    a battery simulator coupled to a mobile station, the battery simulator configured to provide the mobile station with a simulated battery voltage;
    a computer configured to
    measure, for a predetermined time period, a plurality of current measurement data points of the mobile station in standby mode;
    calculate, from the plurality of current measurement data points, an average current consumption associated with the mobile station in the standby mode;
    determine an actual battery capacity of a battery for the mobile station; and
    determine a standby time of the mobile station based on the average current consumption and the actual battery capacity.

11. The system of claim 10, wherein the predetermined time period is less than the standby time.

12. The system of claim 10, wherein the average current consumption measured is an average value determined over the predetermined time period.

13. The system of claim 10, wherein the computer is configured to determine a battery cut off voltage for the mobile station.

14. The system of claim 13, wherein the computer is configured to derive the actual battery capacity in dependence upon the battery cut off voltage of the mobile station.

15. The system of claim 13, wherein the actual battery capacity is an amount of discharge from a fully charged battery to the battery cut off voltage.

16. The system of claim 15, wherein the computer is configured to determine a fully-charged voltage of the battery after being fully charged, and wherein the actual battery capacity is determined based on a difference between the fully-charged voltage and the battery cut off voltage.

17. The system of claim 13, wherein the battery cut off voltage for the mobile station is determined by stepping down the simulated battery voltage until a radio of the mobile station turns off.

18. The system of claim 13, wherein the computer is configured to adjust the simulated battery voltage provided to the mobile station; and determine a voltage level at which a mobile station radio turns off as the battery cut off voltage.

19. A non-transitory computer-readable medium configured with code executable by a computer to cause the computer to:
    measure, for a predetermined time period, a plurality of current measurement data points of a mobile station in standby mode;
    calculate, from the plurality of current measurement data points, an average current consumption associated with the mobile station in the standby mode;
    determine an actual battery capacity of a battery for the mobile station; and
    determine a standby time of the mobile station based on the average current consumption and the actual battery capacity,
    wherein the mobile station is coupled to a battery simulator, the battery simulator configured to provide the mobile station with a simulated battery voltage.

20. The non-transitory computer-readable medium of claim 19, wherein the predetermined time period is less than the standby time.

21. The non-transitory computer-readable medium of claim 19, wherein the average current consumption measured is an average value determined over the predetermined time period.

22. The non-transitory computer-readable medium of claim 19, wherein the code further causes the computer to:
    determine a battery cut off voltage for the mobile station.

23. The non-transitory computer-readable medium of claim 22, wherein the code further causes the computer to:
    derive the actual battery capacity in dependence upon the battery cut off voltage of the mobile station.

24. The non-transitory computer-readable medium of claim 22, wherein the actual battery capacity is an amount of discharge from a fully charged battery to the battery cut off voltage.

25. The non-transitory computer-readable medium of claim 24, wherein the code further causes the computer to
determine a fully-charged voltage of the battery after being fully charged, and wherein the actual battery capacity is determined based on a difference between the fully-charged voltage and the battery cut off voltage.

26. The non-transitory computer-readable medium of claim 22, wherein the battery cut off voltage for the mobile station is determined by stepping down the simulated battery voltage until a radio of the mobile station turns off.

27. The non-transitory computer-readable medium of claim 22, wherein the code further causes the computer to:
adjust the simulated battery voltage provided to the mobile station;
determine a voltage level at which a mobile station radio turns off as the battery cut off voltage.

* * * * *